United States Patent [19]

Adachi

[11] 4,290,340

[45] Sep. 22, 1981

[54] HYDRAULIC BOOSTER

[75] Inventor: Yoshiharu Adachi, Gamagohri, Japan

[73] Assignee: Aisin Seiki Kabushiki Kaisha, Kariya, Japan

[21] Appl. No.: 91,799

[22] Filed: Nov. 6, 1979

[30] Foreign Application Priority Data

Nov. 10, 1978 [JP] Japan ............................... 54-139159
Nov. 10, 1978 [JP] Japan ............................... 54-139160

[51] Int. Cl.³ .............................................. F15B 9/10
[52] U.S. Cl. ........................................ 91/31; 91/49; 91/372; 91/431
[58] Field of Search ............... 91/372, 373, 371, 370, 91/434, 31, 49, 431

[56] References Cited

U.S. PATENT DOCUMENTS

| | | | |
|---|---|---|---|
| 2,883,970 | 4/1959 | Stolzer | 91/373 |
| 3,834,277 | 9/1974 | Yabuta et al. | 91/372 |
| 3,926,093 | 12/1975 | Nakagawa | 91/434 |
| 3,957,074 | 5/1976 | Taft | 91/434 |
| 4,022,111 | 5/1977 | Taft | 91/372 |
| 4,075,848 | 2/1978 | Ueda | 91/370 |
| 4,135,435 | 1/1979 | Adachi | 91/372 |
| 4,154,257 | 5/1979 | Adachi | 137/101 |

Primary Examiner—Paul E. Maslousky
Attorney, Agent, or Firm—Oblon, Fisher, Spivak, McClelland & Maier

[57] ABSTRACT

A hydraulic booster including a housing provided with an inlet hydraulically connected to a pump, a drain port hydraulically connected to a reservoir and a cylindrical bore, a power piston sealingly and slidably disposed within the bore and dividing the cylindrical bore into a working chamber and a drain chamber which is in normal communication with the drain port, an input member sealingly and slidably passed through a first end wall of the bore, the input member having an inner end sealingly and slidably interposed within the power piston and a valve seat formed on the inner end fact thereof, an output member sealingly and slidably passed through a second end wall of the bore and connected to the power piston at an inner end of the power piston the output member provided therein with a passage communicating with the inlet, a poppet valve member sealingly and slidably disposed within the power piston and cooperable with the valve seat for controlling hydraulic communication between the working chamber and the drain chamber, the poppet valve member provided with a passage therethrough and an axial projection on a back face portion thereof, the passage in the poppet valve being in hydraulic communication with the working chamber, and a check valve provided within the power piston for controlling hydraulic communication between the passages and opened by the axial projection of the poppet valve member when the poppet valve is slid by the input member due to engagement thereof with the valve seat upon advancement of the input member.

6 Claims, 2 Drawing Figures

HYDRAULIC BOOSTER

BACKGROUND OF THE INVENTION

1. Field of the Invention

The present invention relates to a hydraulic booster to be used in a closed and/or open hydraulic circuit, and more particularly, to a hydraulic booster for actuating a braking system or a clutch releasing device or a motor vehicle.

2. Description of the Prior Art

A hydraulic booster including a control valve mechanism of a spool valve type has disadvantages with respect to required accuracy of finishing of the control valve mechanism, an amount of leakage of pressurized hydraulic fluid from the control valve mechanism, and inoperability of the control valve mechanism caused by foreign material in the hydraulic fluid as compared with a hydraulic booster including a control valve mechanism of a poppet valve type.

In the conventional hydraulic booster including the control valve mechanism of poppet valve type, however, the valve member for controlling hydraulic communication between a working chamber and a drain chamber which are positioned at opposite sides of a power piston is urged by the hydraulic pressure in the working chamber toward the drain chamber under an operating condition of the booster, thereby causing a relatively larger hysterisis of the operational character of the booster. In addition, the conventional control valve mechanism needs a relatively larger space for positioning thereof.

In addition, in a hydraulic booster provided with an open circuit, it is desirable to provide a damping means for preventing an input member from vibration caused by pulsation of a pump.

SUMMARY OF THE INVENTION

It is one object of the present invention to provide a hydraulic booster including a novel and improved control valve mechanism of a poppet valve type so as to solve the above-noted problems of a conventional control valve mechanism of the poppet valve type.

Another object of the present invention is to provide the hydraulic booster including a compact damping means for preventing an input member from vibration caused by pulsation of a hydraulic pump.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
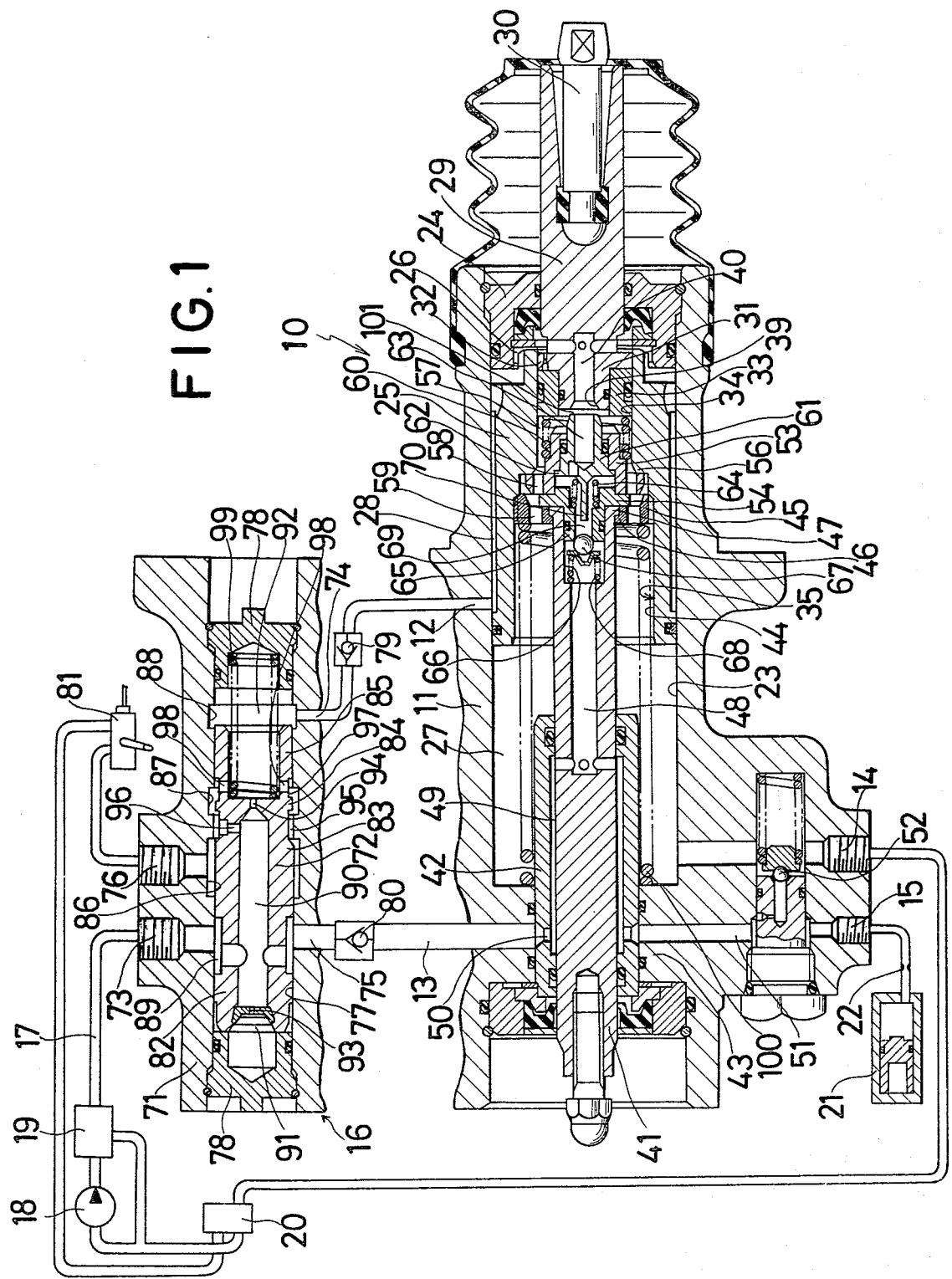
FIG. 1 is a sectional view of one preferred embodiment of hydraulic booster according to the present invention under its normal condition.

Referring to FIG. 1, there is shown a hydraulic booster 10 including a housing 11 provided with inlets 12 and 13, a drain port 14 and a port 15. The inlets 12 and 13 are connected through a flow dividing valve 16 to a discharging passage 17 of a pump 18 driven by the vehicle's engine, not shown. The discharging passage 17 is provided with a flow controlling valve 19 with a relief valve disposed therein. The drain port 14 is directly connected to a reservoir 20, the port 15 is connected to an accumulator 21 through an orifice 22.

The housing 11 is provided with a cylindrical bore 23, one end of which is sealingly closed by a guiding member 24 fixed to the housing 11. A power piston 25 is sealingly and slidably disposed within the cylindrical bore 23 to divide the cylindrical bore 23 into a working chamber 26 and a drain chamber 27. The working chamber 26 is in normal communication with the inlet 12 through a passage 28 formed on the outer surface of the power piston 25, while the drain chamber 27 is in normal communication with the drain port 14.

An input member 29 is sealingly and slidably passed through a central portion of the guiding member 24 and is mechanically connected through a connecting rod 39 to a brake or clutch releasing pedal (not shown). The input member 29 is provided with an inner end portion 31 of reduced diameter and a flange portion 32 of increased diameter. The inner end portion 31 of the input member 29 is sealingly and slidably received within a reaction regulating piston 33 of annular shape which is in turn sealingly and slidably received within a smaller diameter portion 34 of a stepped cylindrical bore 35 formed within the power piston 25.

Figure 2:
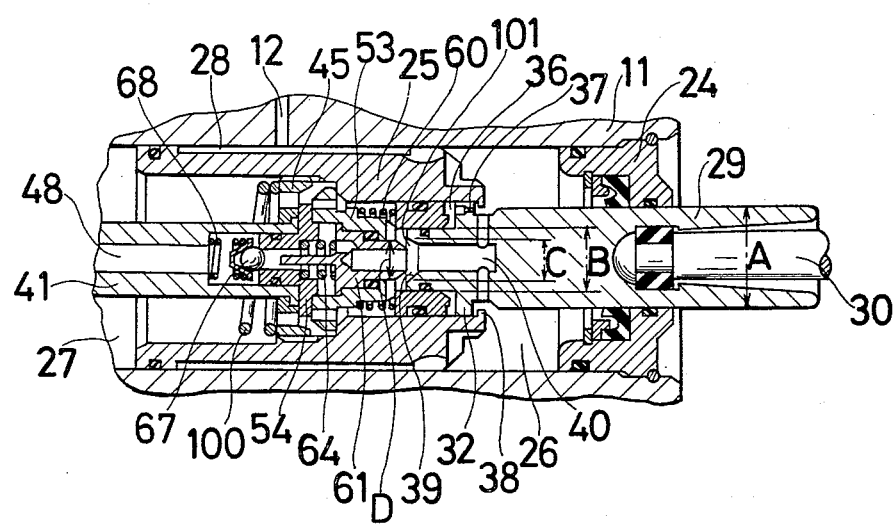
FIG. 2 is a partial sectional view of the hydraulic booster shown in FIG. 1, but showing its operated condition.

The flange portion 32 of the member 29 is sealingly and slidably received within the portion 34 of the bore 35 for defining a damping chamber 36 which is clearly shown in FIG. 2 and is in normal communication with the working chamber 26 through an orifice 37 formed in the flange portion 32. The power piston 25 is provided with a flange 38 which is engageable with the flange portion 32 of the input member 29 for limiting the sliding movement of the member 29 relative to the power piston 25. A valve seat 39 of conical shape is formed on an inner end surface of the input member 29 and is in normal communication with the working chamber 26 through a passage 40 formed within the member 29.

An output member 41 is sealingly and slidably passed through a guiding sleeve 42 which is in turn sealingly passed through an end wall 43 closing the other end of the bore 23 and is fixed to the housing 11. An inner end of the member 41 is positioned within a larger diameter portion 44 of the bore 35 of the power piston 25 and is fixedly connected to the power piston 25 by a nut 45. The nut 45 is in screw-threaded engagement with the power piston 25 and is provided with a flange 46 which engages with a flange 47 provided on the output member 41 for limiting the axial movement of the member 41 away from the power piston 35. The output member 41 is provided with a passage 48 therein which is in normal communication with an annular passage 49 defined by the output member 41 and the sleeve 42. The annular passage 49 is normally in communication with the inlet 13 through a passage 50 formed within the sleeve 42. The passage 50 is in normal communication with the port 15 through a passage 51 formed within the housing 11. A relief valve 52 for limiting the maximum pressure in the accumulator 21 is provided within the housing 11.

In the bore 35 of the power piston 25, a hollow guide member 53 is fixedly disposed between the inner ends of the input member 29 and the output member 41 and a valve seat 54 is disposed between the inner end of the output member 41 and the hollow guiding member 53. Outer peripheral portions of the hollow guiding member 53 and valve seat 54 and the flange 47 of the output member 41 are tightly clamped between nut 45 and shoulder 56 of the power piston 25. A chamber 57 defined between the input member 29, reaction regulating piston 33 and hollow guiding member 53 is in normal communication with drain chamber 27 through passages 58 and 59 formed within the member 53 and the nut 45, respectively. A spring 60 disposed between the reaction regulating piston 33 and hollow guiding member 53 urges the piston 33 toward the flange portion 32 of input member 29.

The hollow guiding member 53 sealingly and slidably receives a poppet valve 61 therein so as to control hydraulic communication between passage 40 and chamber 57 in cooperation with valve seat 39 on input member 29. The poppet valve 61 is provided with a flange 62 for limiting sliding movement thereof and passage 63 therethrough. A spring 64 interposed between the back face of the poppet valve 61 and valve seat 54 urges valve 61 toward input member 29. The valve seat 54 is provided with a sleeve portion 65 which is sealingly inserted into an enlarged end 66 of passage 48 in output member 41. A check ball 67 disposed within end 66 of passage 48 is urged by spring 68 so as to close passage 69 in valve seat 54. The poppet valve 61 is provided on the back face thereof with an axial projection 70 for disengaging check ball 67 from valve seat 54 when valve 61 is moved due to seating thereof on valve seat 39 during sliding of input member 29. Passages 40, 48 and 63 are substantially aligned so as to reduce the resistance against fluid flow therethrough.

The flow dividing valve 16 includes a body 71 and a spool 72. The body 71 is provided with an inlet 73, outlets 74, 75 and 76, and a cylindrical bore 77 both ends of which are sealingly closed by plugs 78 fixed to the body 71. The inlet 73 is connected to the discharging passage 17 of the pump 18. The outlets 74 and 75 are connected to the inlets 12 and 13 of the booster 10 through check valves 79 and 80, respectively. The outlet 76 is connected to the reservoir 20 through a hydraulic device 81 of an open-center type such as power steering gear. The spool 72 is slidably disposed within the bore 77 and is provided with lands, 82, 83, 84 and 85 on an outer periphery thereof, while the body 71 is provided with annular grooves 86, 87 and 88 on a cylindrical inner surface thereof.

An annular groove 89 defined between lands 82 and 83 is in normal communication with inlet 73, outlet 75 and passage 90 formed in spool 72. The passage 90 is in normal communication with chambers 91 and 92 defining opposite sides of spool 72 through orifices 93 and 94 provided in the spool 72, respectively. An annular groove 95 defined between the lands 83 and 84 is in normal communication with passage 90 through an orifice 96 formed in spool 72. An annular groove 97 defined between lands 84 and 85 is in normal communication with chamber 92 through passages 98 formed in spool 72. A spring 99 disposed within the chamber 92 urges the spool 72 toward chamber 91.

The above-described construction without the outlet 75 of the flow dividing valve 16 is disclosed in U.S. Pat. No. 4,154,257 granted on May 15, 1979 to Yoshiharu Adachi. The flow dividing valve 16 usually divides the hydraulic fluid flow from the pump 18 into two flows in outlets 74 and 76 and maintains the flow in outlet 76 if the flow in the outlet 74 is blocked upon operation of the booster 10 as described in the above U.S. Patent.

In operation of the booster 10, FIG. 1 illustrates the inoperative condition wherein the hydraulic fluid discharged from outlet 74 flows to the reservoir 20 through check valve 79, passage 28 working chamber 26, passage 40, gap 101 between the valve seat 39 and poppet valve 61, chamber 57, passages 58 and 59, drain chamber 27 and drain port 14 without any restriction so that no hydraulic pressure is generated in working chamber 26 to locate power piston 25 at the return position shown in FIG. 1 by return spring 100.

When the operator depresses the pedal at normal depressing speed, input member 29 and reaction regulating piston 33 are slid against spring 60, gap 101 between valve seat 39 and poppet valve 61 is decreased upon the sliding movement of input member 29 relative to power piston 25, and the fluid flow to chamber 57 from passage 40 is restricted upon the reduction of gap 101 so that the hydraulic pressure in working chamber 26 increases. The increased hydraulic pressure in working chamber 26 acts on power piston 25 to move power piston 25 and output member 41 against spring 100. Simultaneously, the increased hydraulic pressure in working chamber 26 communicates with damping chamber 36 through orifice 37 and acts on reaction regulating piston 33 so as to space piston 33 from flange portion 32 of input member 29 against spring 60, but piston 33 is engaged with flange portion 32 by spring 60 until hydraulic pressure in working chamber 26 increases to a predetermined value of relatively lower pressure. In this condition, the effective area of hydraulic pressure in working chamber 26 relating to a reaction force experienced on input member 29 is substantially limited to a smaller area which is determined by diameter C of valve seat 39, so that the reaction force is substantially provided by spring 60 and is maintained constant.

When hydraulic pressure in working chamber 26 is increased above the predetermined value upon increasing of the pedal depressing force, reaction regulating piston 33 is spaced from flange portion 32 of input member 29 by hydraulic pressure until piston 33 is rested on hollow guiding member 53. Such displacement of piston 33 increases the effective area of the hydraulic pressure relating to the reaction force of input member 29, the increased effective area being determined by diameters A, B and C of input member 29 and valve seat 39, so that the reaction force is increased in accordance with the hydraulic pressure in working chamber 29.

The hydraulic fluid flow discharged from outlet 74 does not have enough flow quantity to rapidly move power piston 25. Therefore, if the pedal is rapidly depressed, poppet valve 61 will be seated on valve seat 39 and slid against spring 64 upon rapidly sliding movement of input member 29. Thus, check ball 67 is disengaged from valve seat 54 by projection 70 of poppet valve 61 and passage 69 in valve seat 70 is opened so that hydraulic fluid flows from outlet 75 of flow dividing valve 16 into working chamber 26 through check valve 80, inlet 13 and passages 50, 49, 48, 69, and 40 since hydraulic pressure in outlet 75 is higher than hydraulic pressure in working chamber 26 due to the flow dividing operation of valve 16 or the operation of hydraulic device 81. This additional flow into working chamber 26 assists the increasing of hydraulic pressure in working chamber 26 and causes the rapid slide of power piston 25.

When hydraulic pressure in working chamber 26 increases above a value according to the pedal depressing force, input member 29 and poppet valve 61 are slid by hydraulic pressure in working chamber 26 toward guiding member 24. Thus, check ball 67 is seated on valve seat 54 and valve seat 39 is disengaged from poppet valve 61 so as to maintain hydraulic pressure in working chamber 26 at the value according to the pedal depressing force due to the restriction against the flow discharged from outlet 74 of valve 16.

When the pedal is released, input member 29 is slid toward guiding member 24 by hydraulic pressure in working chamber 26 until flange portion 32 engaged with flange 38 of power piston 25, gap 101 between valve seat 39 and poppet valve 61 increased at a maximum value as shown in FIG. 1. Therefore, hydraulic pressure in working chamber 26 decreases to the lower value the same as hydraulic pressure in drain chamber 27. Power piston 25 and output member 41 are returned by spring 100 at the positions shown in FIG. 1.

In operation of booster 10, although hydraulic pressure in working chamber 26 acts on poppet valve 61 so as to urge valve 61 toward input member 29, this urging force on valve 61 is of no effect relative to the reaction force on input member 29 since hydraulic pressure effecting area of valve 61 is small in accordance with a difference between diameters D and C of valve 61 and valve seat 39, so that the hysterisis of the operational character of booster 10 is small.

When hydraulic pressure in outlet 75 of flow dividing valve 16 is increased by the operations of hydraulic device 81 or booster 10, the pressurized fluid in outlet 75 of valve 16 is supplied into accumulator 21 through check valve 80, inlet 13, passage 50 and 51, port 15 and orifice 22. The pressurized fluid accumulated within accumulator 21 is in normal communication with passage 48 in output member 41 through orifice 22, port 15, passages 51, 50 and 49. Therefore, if pump 18 fails, booster 10 is operable. It should be noted that inlet 12 may be omitted if booster 10 is provided with a closed hydraulic circuit.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic booster comprising:
   a housing provided with a cylindrical bore and an inlet hydraulically connected to a pump, a drain port hydraulically connected to a reservoir and said cylindrical bore;
   a power piston being sealingly and slidably disposed within said bore and dividing said cylindrical bore into a working chamber to which fluid is normally supplied and a drain chamber which is in normal communication with said drain port;
   an input member sealing and slidably passed through a first end wall of said bore, said input member having an inner end sealingly and slidably interposed within said power piston and a valve seat formed on the inner end face thereof, said input member being provided with a passage communicating with said working chamber and said valve seat;
   an output member sealingly and slidably passed through a second end wall of said bore and connected to said power piston at an inner end portion thereof, said output member being provided therein with a passage communicating with said inlet;
   a poppet valve member spaced from said input member sealing slidably disposed within said power piston and cooperable with said valve seat for controlling hydraulic communication between said working chamber and said drain chamber, said poppet valve member being provided with a passage there through and an axial projection on a back face portion thereof, said passage in said poppet valve normally being in hydraulic communication with said working chamber via said passage in said input member, each of said passages being in substantial alignment with one another wherein said poppet valve member has a diameter approximately equal to that of said valve seat; and
   a check valve provided within said power piston for controlling hydraulic communication between said passages in said output member and said poppet valve member and opened by said axial projection of said poppet valve member when said poppet valve is slid by said input member due to engagement thereof with said valve seat upon advancement of said input member.

2. A hydraulic booster comprising:
   a housing provided with a cylindrical bore and an inlet hydraulically connected to a pump, a drain port hydraulically connected to a reservoir and said cylindrical bore;
   a power piston being sealingly and slidably disposed within said bore and dividing said cylindrical bore into a working chamber to which fluid is normally supplied and a drain chamber which is in normal communication with said drain port;
   an input member sealingly and slidably passed through a first end wall of said bore, said input member having an inner end sealingly and slidably interposed within said power piston and a valve seat formed on the inner end face thereof said input member being provided with a passage communicating with said working chamber and said valve seat;
   an output member sealingly and slidably passed through a second wall of said bore and connected to said power piston at an inner end portion thereof, said output member being provided therein with a passage communicating with said inlet;
   a poppet valve member spaced from said input member sealingly and slidably disposed within said power piston and cooperable with said valve seat for controlling hydraulic communication between said working chamber and said drain chamber, said poppet valve member being provided with a passage therethrough and an axial projection on a back face portion thereof, said passage in said poppet valve normally being hydraulic communication with said working chamber via said passage in said input member, each of said passages being in substantial alignment with one another wherein said poppet valve member has a diameter approximately equal to that of said valve seat; and
   a check valve provided within said power piston for controlling hydraulic communication between said passages in said output member and said poppet valve member and opened by said axial projection of said poppet valve member when said poppet valve is slid by said input member due to engagement thereof with said valve seat upon advancement of said input member wherein said housing is provided with an additional inlet for providing fluid communication between said pump and said working chamber, said input member defining a second damping chamber which communicates with said working chamber within said power piston.

3. A hydraulic booster as set forth in claim 1, further comprising:
  a guiding member fixedly mounted in said power piston and within which said poppet valve member is mounted.

4. A hydraulic booster as set forth in claim 2, further comprising:
  a reaction regulating piston slidably mounted within said power piston.

5. A hydraulic booster as set forth in claim 1, further comprising:
  a guiding member fixedly mounted in said power piston and within which said poppet valve member is mounted.
  a reaction regulating piston slidably mounted within said power piston.

6. A hydraulic booster comprising:
  a housing provided with a cylindrical bore and an inlet hydraulically connected to a pump, a drain port hydraulically connected to a reservoir and said cylindrical bore;
  a power piston being sealingly and slidably disposed within said bore and dividing said cylindrical bore into a working chamber to which fluid is normally supplied and a drain chamber which is in normal communication with said drain port;
  an input member sealingly and slidably passed through a first end wall of said bore, said input member having an inner end sealingly and slidably interposed within said power piston and a valve seat formed on the inner end face thereof said input member being provided with a passage communicating with said working chamber and said valve seat;
  an output member sealingly and slidably passed through a second wall of said bore and connected to said power piston at an inner end portion thereof, said output member being provided therein with a passage communicating with said inlet;
  a poppet valve member spaced from said input member sealingly and slidably disposed within power piston and cooperable with said valve seat for controlling hydraulic communication between said working chamber and said drain chamber, said poppet valve member being provided with a passage therethrough and an axial projection on a back face portion thereof, said passage in said poppet valve normally being hydraulic communication with said working chamber via said passage in said input member, each of said passages being in substantial alignment with one another wherein said poppet valve member has a diameter approximately equal to that of said valve seat; and
  a check valve provided within said power piston for controlling hydraulic communication between said passages in said output member and said poppet valve member and opened by said axial projection of said poppet valve member when said poppet valve is slid by said input member due to engagement thereof with said valve seat upon advancement of said input member:
  a guiding member fixed mounted in said power piston and within which said poppet valve member is mounted;
  a reaction regulating piston slidably mounted within said power piston; and
  biasing means disposed between said guiding member and said reaction regulating piston.

* * * * *